United States Patent Office 2,928,746
Patented Mar. 15, 1960

2,928,746

FLAVORING MATERIAL AND SHORTENING

Ray B. Donohue and Richard J. Bell, Sherman, Tex., assignors to Anderson, Clayton & Co., Houston, Tex., a corporation of Delaware No Drawing. Application March 26, 1957
Serial No. 648,522

6 Claims. (Cl. 99—123)

The present invention relates to a flavoring compound or material for shortening, whether of the liquid, semi-solid or plastic type, and to flavored shortenings.

The flavoring agents or materials of the prior art have not been entirely satisfactory due to the fact that there is very little carry through or carry over of the flavor into the finished product. This is particularly true of butter-type flavoring and coloring materials which have been added to liquid, semi-solid or plastic-type shortenings. The present invention is directed to a new and improved butter-like coloring and flavoring material, which when added to shortening, either liquid, semi-solid or plastic, has a remarkable carry through or carry over into the finished product, for example in baking, frying or any other application of fats and oils to edible consumption.

Accordingly, it is an object of this invention to provide an improved flavoring compound which has improved carry over or carry through characteristics into the final food product to which it is added.

Still a further object of the present invention is the provision of a butter-like flavoring and coloring compound which has improved carry through or carry over characteristics into the final food product to which it is added.

Yet a further object of the present invention is the provision of an improved fatty food ingredient, such as liquid, semi-solid or plastic shortening, salad oil, cooking oil and the like, which when incorporated into baked goods, fried foods, or any other application of fats and oils to edible consumption, imparts an enhanced and desirable appearance, flavor, aroma and palatability.

Still a further object of the present invention is the provision of methods of making semi-solid or plastic shortenings which have improved flavoring carry over characteristics into the finished product.

Other and further objects, features, and advantages will appear as the description of presently-preferred examples of the invention proceeds.

For the purpose of this disclosure, the invention will be described in connection with the preparation of semi-solid or plastic shortenings, made from vegetable fats and/or meat fats; although, the invention is applicable to liquid shortenings, salad oils, cooking oils and the like. By the term "shortening" it is meant substances, liquid, semi-plastic or plastic, of an oleaginous nature usually used for baking, cooking, frying and the like. Other uses, of course, will occur to those skilled in the art.

The conventional shortenings, like the natural fats and fatty oils entering into their composition, are essentially triglycerides, in which fatty acids and glycerin are combined in the ratio of three mols to one mol, respectively. No known natural fat contains glycerin in substantially greater amounts than one mol to each three mols of total fatty acid. In the case of conventional shortenings made from natural vegetable fats, the vegetable fats are first refined usually with an alkali reagent, such as sodium hydroxide, and by either the so-called batch (kettle) method or the continuous centrifugal method to remove variable amounts of non-glyceride impurities from the crude fats produced by expression or solvent extraction. Among these impurities are chromaphoric pigments in the forms of carotene, chlorophyll and xanthophyll. Next, the fats or oils are bleached, preferably by the continuous vacuum bleaching process to assure the oxidative stability, in order to further remove the natural color bodies and to remove any residual soap resultant from the refining operation. After bleaching, the fats or oils are selectively hydrogenated to a predetermined endpoint to attain the best possible consistency in a finished shortening of the longest possible shelf-life or oxidative and bland flavor stability. After selective hydrogenation, the partially hydrogenated fats are blended with an essentially completely hydrogenated fat, not necessarily germane to the partially hydrogenated fat, to extend the finished shortening's usability, or plastic range and to provide a stiffening effect at higher temperatures. The blend of fats is then bleached a second time to scrub out any foreign, solid materials, such as hydrogenation catalyst, and to further reduce the natural pigmentation, primarily chlorophyll, which makes a conventional white shortening appear "muddy" or have a grayish off-cast. The fat blend is then steam distilled, in vacuo, commonly referred to as deodorization by the industry, to remove malodorous and bad flavor imparting materials and precursory compounds causing oxidation and flavor reversion. The resultant deodorized fat is bland in taste and essentially denuded of any typical flavor. The fat is then rapidly chilled in specially designed equipment, which is termed plasticization and treated to stabilize the crystalline structure of the plasticized shortening. Crystal stabilization has an important effect on the end use of a shortening, particularly in baking. Mono- and di-glyceride compounds may or may not be added to a shortening before plasticization to improve the cake baking performance of a shortening.

No more description is deemed necessary of the manner of making the semi-solid or plastic shortening, as any preferred method may be utilized. The shortenings, however, are improved by incorporating flavoring compounds of the present invention in that the shortening has a delectable flavor having remarkable carry through properties to the final product.

The following examples illustrate the preparation of colored, semi-solid or plastic shortenings having a butter-like flavor.

*Example I*

A conventional white, bland, shortening was formulated in accordance with the foregoing described procedure. Before plasticization, 35 p.p.m. of a preparation containing beta carotene including a starter distillate reinforced with diacetyl to which have been added five p.p.m. iso amyl acetate. This was added to the shortening to an equivalent of 7,000 vitamin A units per pound of fat. The shortening was then plasticized, as previously described, and the resultant plasticized shortening had a pleasant, buttery aroma which was incorporated into various foods prepared with this shortening, for example, sugar cookies, sand tarts, white cake, confectioners icing and the like. The carry over and carry through properties into the finshed product were remarkable.

The starter distillate reinforced with diacetyl, referred to above, is a recognized flavoring material listed in allowable flavoring materials for use in margarine. Starter distillates are made by culturing milk under proper sanitary and temperature conditions with bacterial cultures especially developed for the ripening of milk. This cultured milk is then distilled and a clear liquid distillate is obtained which contains diacetyl and other chemical compounds, for example methylacetyl carbinol, ethyl butyrate and others. This starter distillate provides a butter-like flavor and aroma. The addition of iso amyl acetate to this distillate (starter material) surprisingly gives the carry through or carry over of the flavor into the finished baked, cooked or other foods which is not accomplished without it.

*Example II*

Another shortening was prepared in the same manner as described in Example I except that 35 p.p.m. starter material and 20 p.p.m. iso amyl acetate was added to a commercially available, white, bland shortening in fatty food usage. This shortening was a blend of selectively hydrogenated soybean oil and cottonseed oil, hard vegetable fat and mono- and diglycerides, the 35 p.p.m. starter material and 20 p.p.m. iso amyl acetate being added just before plasticization. In using this flavored shortening the carry through or carry over of the buttery flavoring to the finished product was remarkable. For example, egg cakes, sand tart cookies, confectioners icing, biscuits, custard pie, white cakes, sugar cookies, and fried chicken prepared with this shortening, the carry through or carry over characteristics were greatly enhanced.

As previously mentioned, the flavoring compounds may be added just before plasticization, although they may be added at any preferred time in the process.

While the coloring and flavoring compounds of the present invention have been described specifically in connection with semi-solid or plastic shortenings, these compounds may be incorporated into various other products, with or without artificial coloring.

The present invention, therefore, is well suited to carry out the objects and attain the ends and advantages mentioned as well as others inherent therein.

Various changes in details and uses of the present invention will suggest themselves to those skilled in the art which are encompassed within the spirit of the invention and the scope of the appended claims.

What is claimed is:

1. A flavoring compound comprising beta-carotene, starter material and iso amyl acetate.
2. A flavoring compound comprising beta-carotene, diacetyl, methyl acetyl carbinol, ethyl butyrate and iso amyl acetate.
3. A shortening including a flavoring compound comprising beta-carotene, starter distillate and iso amyl acetate.
4. A shortening including a flavoring compound comprising beta-carotene, diacetyl, methyl acetyl carbinol, ethyl butyrate and iso amyl acetate.
5. A shortening having incorporated therein a flavoring compound comprising starter distillate and iso amyl acetate.
6. A flavoring compound comprising starter material and iso amyl acetate.

References Cited in the file of this patent
UNITED STATES PATENTS 2,521,242    Mitchell  ---------------- Sept. 5, 1950

OTHER REFERENCES

Jacobs: "Synthetic Food Adjuncts," D. Van Nostrand Co., Inc., New York, (1947), p. 101.

Schwitzer: "Margarine And Other Food Fats," Interscience Publishers, Inc., New York (1956), pp. 118, 262 and 264.